Patented Mar. 22, 1932

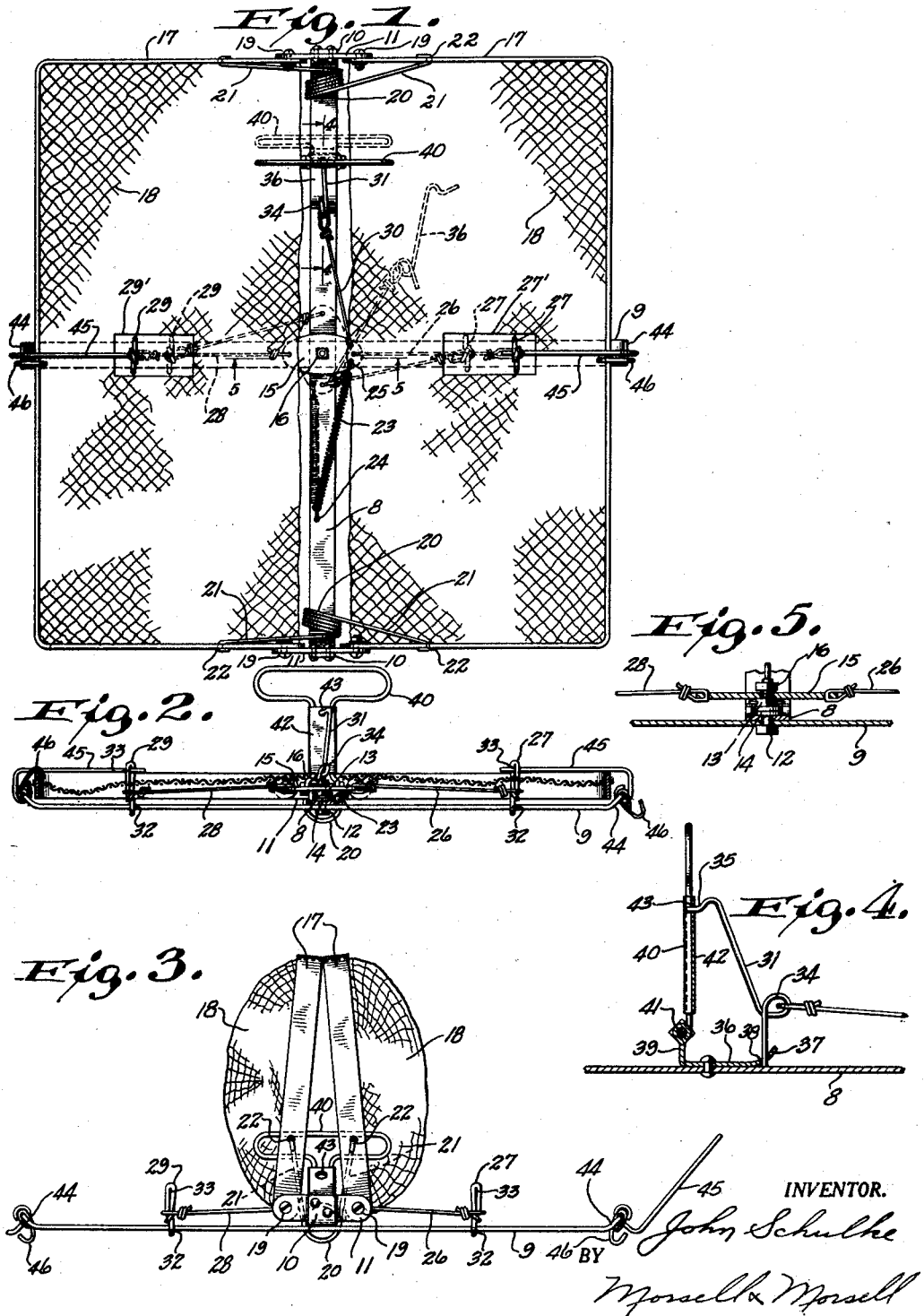

1,850,182

UNITED STATES PATENT OFFICE

JOHN SCHULKE, OF GLIDDEN, WISCONSIN

TRAP

Application filed January 8, 1931. Serial No. 507,333.

This invention relates to improvements in traps.

In capturing fur bearing animals such as beaver, muskrat, mink and the like, it is of considerable advantage to be able to catch and retain the animal alive, as when the animal is in this condition, the fur is uninjured. Furthermore, the live animals may be used for breeding purposes. When an animal is caught in a trap having jaws which grip a portion of its body, the fur is frequently cut by the jaws, or is injured during the animal's efforts to free itself. Live traps designed to retain the animal alive between foldable frames of wire mesh have been in use for some time. These traps, however, as now constructed, have no provision for insuring that the animal is in the center of the trap when the latter is sprung, and as a result, the animal is frequently halfway out of the frame and is caught between the metal edges thereof. When this occurs, the animal is either killed by the action of the trap or is so ineffectively held that it can free itself.

It is, therefore, one of the objects of this invention to provide an improved trap for capturing live animals having means providing for proper positioning of the animal in the center of the trap when the latter is sprung.

A more specific object of this invention is to provide an improved trap in which the trigger is positioned nearer one side of the frame than the other, and in which said trigger can be moved in an outwardly direction only to insure proper positioning of the animal within the trap.

A further object of the invention is to provide a trap having an improved latch control responsive to the action of the trigger, for holding the frame members in open position.

Other objects of the invention are to provide a trap which may be set with safety; in which the action is positive; which is compact; simple in construction; and inexpensive to manufacture.

With the above and other objects in view, the invention consists of the improved trap and all its parts and combinations as set forth in the claims and all equivalents thereof.

In the accompanying drawings illustrating one complete embodiment of the preferred form of the invention in which the same reference numerals designate the same parts in all of the views:

Fig. 1 is a plan view of the trap in open position;

Fig. 2 is a transverse sectional view thereof;

Fig. 3 is an end view of the trap showing it in closed position;

Fig. 4 is an enlarged detail sectional view taken on line 4—4 of Fig. 1; and

Fig. 5 is an enlarged detail sectional view taken on line 5—5 of Fig. 1.

Referring to the drawings, the numerals 8 and 9 designate crossed base bars which are preferably formed of flat metal strips. The bar 8 has its ends flanged upwardly as at 10, and each of said flanged portions has a plate 11 secured thereto and extending outwardly at each side. A bolt 12 projects upwardly through the base bars 8 and 9 at their point of crossing and has a nut 13 threaded thereon and engaging washers 14. A latch control plate 15 which is preferably oval in shape, is pivotally mounted on the bolt above the nut 13. Another nut 16 is threaded on the bolt above the plate.

Frame members 17 for wire mesh 18 are pivoted to the plates 11 as at 19 to provide for folding of the frames toward one another in the manner of closing a book. Spring members 20 are coiled around the ends of the base bar 8 and each of said members has an arm 21 extending in each direction and engageable with the sides of the frame as at 22. Said springs tend to normally hold the frames in the closed position shown in Fig. 3. Said frame members 17 form releasable means for enclosing an animal.

A coiled spring 23 has one end secured to the base bar 8 as at 24 and has its other end secured to one end of the oval plate 15 as at 25. A trip wire 26 extends from said end of the plate 15 and carries at its outer end a trip rod loop 27. A similar trip rod wire 28 extends from the opposite end of the plate 15 and also carries a trip rod loop 29. Another wire 30 extending from the end of the plate 15 to which the coiled spring 23 is connected, carries at its outer end a trigger holder 31. The trip rod loops 27 and 29 have a lower eye portion 32 which surrounds and is slidable on the base bar 9. They are also provided with upper loops 33 which are arranged to project through openings 27' and 29' respectively in the mesh as shown in Fig. 1 when the trap is in open position. The trigger holder 31 is formed of a single length of rigid wire having a central loop 34 to which the wire 30 is connected and having its upper engaging end curved outwardly as at 35.

A trigger plate 36 is secured to the base bar 8 on the side thereof away from the coiled spring 23 and in a position intermediate between the center bolt 12 and the adjacent end of the base bar. Said trigger base plate has one end curved upwardly as at 37 and formed with an aperture 38 for receiving the lower end of the trigger holder 31 and is provided at its other end with an upward extension 39 to which a trigger member 40 is pivoted as at 41.

The trigger is formed of a length of wire looped into substantially T-shape, the stem of the T-shaped loop being reinforced by a plate 42. The plate 42 is provided near its upper end with an opening 43 within which the bent portion 35 of the trigger holder 31 is adapted to engage.

The ends of the base bar 9 are bent upwardly as at 44 and said ends have pivoted thereto L-shaped trip rods 45 and safety hooks 46.

In setting the device, the frame members are spread open to the position shown in Fig. 1 against the tension of the springs 20 and the safety hooks 46 are pivoted over the edges of the frame to temporarily hold the frame members in open position. The various parts of the device are in the position shown by dotted lines in Fig. 1, the oval plate 15 being substantially parallel to the base bar 8. Next, the trigger 40 is raised to a substantially vertical position and the trigger holder 31 is grasped and pulled toward the trigger. Through the wire 30 this will cause a pivoting of the oval plate 15 to the position shown by full lines in Fig. 1. The lower end of the trigger holder is then inserted in the opening 38 of the trigger base plate 36 in the manner shown in Fig. 4, and the upper end of the trigger holder is engaged with the aperture 43 of the plate 42 of the trigger. This will maintain the trigger holder in position and the plate 15 in its pivoted position against the tension of the spring 23. Next, the trip rods 45 are swung over the edges of the frame and their ends are caused to extend through the loops 33 of the members 27 and 29, said loops projecting through apertures in the wire mesh. The trip rods and cooperating loops will therefore act as latch mechanisms to hold the frames in open position in the manner shown in Figs. 1 and 2, and the safety hooks 46 may therefore be released.

The trap may be positioned under water, usually near the shore, with the side of the trap near which the trigger is located, nearest to the shore, and as an animal swims over the trap from the water side toward the trigger 40, it will be substantially in the center of the frame when its head or fore feet strike the trigger to cause the latter to move outwardly. This will release the trigger holder and the coiled spring 23 will cause the plate 15 to return to the dotted line position shown in Fig. 1. This movement will also pull the trip rod loops 27 and 29 inwardly to release the ends of the trip rods. When the latter are freed, the frame members will immediately spring together through the action of the springs 20 to enclose the animal and due to the position which the animal must be in, in order to operate the trigger, it will be held within the center of the trap in perfect condition.

If the animal should approach the trap from the landward side toward the side of the trap nearest to which the trigger is located, the forward movement of the animal will not push the trigger in the proper direction to release the trigger holder 31, and the animal cannot therefore be caught off center. However, if after it has entered the trap it kicks rearwardly with its hind feet, as is frequently the case, the trigger holder will be released and the animal will be captured while within the center of the trap.

From the above description it will be readily seen that due to the off center position of the trigger, and due to the fact that it can be moved in one direction only to cause a closing of the frame members, that a very desirable construction has been provided which insures proper positioning of the animal within the trap when the latter is sprung. It may also be seen that the novel trip rod holding means operable by rotation of the central pivoted plate 15, provides a simple and effective means, responsive to the trigger action, for holding the frame members in open position and for permitting quick and positive closing of the same.

Although only one form of the invention has been shown and described, it is not desired to be limited to this exact showing, as the broad concept of the invention includes all changes and modifications as may come within the scope of the claims.

What I claim is:

1. In an animal trap, a base, releasable means in connection with said base for capturing an animal, yielding means normally urging said releasable means to capturing position, latch mechanism for holding said releasable means in set position against the tension of said yielding means, and a trigger supported by said base a substantial distance off center and connectible with said latch mechanism to maintain the latter in latching position, said trigger being movable in an outwardly direction only to release the latch mechanism and cause springing of the trap, to insure proper positioning of the animal.

2. In an animal trap, a base, a pair of frame members pivotally connected to said base and movable toward one another to enclose an animal, yielding means normally urging said frame members to closed position, latch mechanism for holding said frame members in open position against the tension of said yielding means, and a trigger pivotally connected to said base a substantial distance off center and connectible with said latch mechanism to maintain the latter in latching position, said trigger being movable in an outwardly direction only to release the latch mechanism and cause closing of the frame members, to insure proper positioning of the animal.

3. In an animal trap, a base, a pair of frame members pivotally connected to said base and movable toward one another to enclose an animal, yielding means normally urging said frame members to closed position, latch mechanism for holding said frame members in open position against the tension of said yielding means, a latch control pivoted to the base and connected with said latch mechanism, yielding means normally urging said latch control to a pivoted position to cause disengagement of the latch mechanism, a trigger in connection with the base, and means connected to said latch control and connectible with said trigger to hold the latch control against the tension of its yielding means in a position to provide for engagement of the latch mechanism, said trigger being movable to release said latch control, and said latch control being in turn urged by its yielding means to cause disengagement of the latch mechanism and closing of the frame members.

4. In an animal trap, a base, releasable means connected to said base for capturing an animal, yielding means normally urging said releasable means to capturing position, latch mechanism for holding said releasable means in set position against the tension of said yielding means, a latch control member yieldingly pivoted to said base, a connection between said latch control member and said latch mechanism, a trigger connected to said base at a point removed from the latch control member, and a trigger holder connected to said latch control member and connectible with said trigger for maintaining said latch control member in a position to provide for engagement of the latch mechanism, said trigger being movable to release said trigger holder and said yieldingly pivoted latch control being responsive to release of the trigger holder to cause disengagement of the latch mechanism and springing of the trap.

5. In an animal trap, a base, a pair of frame members pivotally connected to said base and movable toward one another to enclose an animal, yielding means normally urging said frame members to closed position, latch mechanism for each of said frame members to hold the latter in open position against the tension of said yielding means, a latch control plate pivoted to the base, elongated connections between said latch mechanism and said plate, yielding means normally urging said latch control plate to a pivoted position to cause a pull on said elongated members and release of said latch mechanism, a trigger in connection with the base, and an elongated member extending from said latch control plate and connectible with said trigger to hold the latch control plate against the tension of its yielding means in a pivoted position to provide for engagement of the latch mechanism, said trigger being movable to release said latch control plate and to cause disengagement of the latch mechanism and closing of the frame members.

6. In an animal trap, a base, a pair of frame members pivotally connected to said base and movable toward one another to enclose an animal, yielding means normally urging said frame members to closed position, latch mechanism for each of said frame members to hold the latter in open position against the tension of said yielding means, a latch control plate pivoted to the base, elongated connections between said latch mechanism and said plate, yielding means normally urging said latch control plate to a pivoted position to cause a pull on said elongated members and release of said latch mechanism, a trigger in connection with the base a substantial distance off center, and an elongated member extending from said latch control plate and connectible with said trigger to hold the latch control plate against the tension of its yielding means in a pivoted position to provide for engagement of the latch mechanism, said trigger being movable in an outwardly direction only to release said latch control plate and to cause disengagement of the latch mechanism and closing of the frame members.

7. In an animal trap, a base, releasable means connected to said base for capturing an animal, yielding means normally urging said releasable means to capturing position, latch mechanism for holding said releasable means in set position against the tension of said yielding means, a trigger pivoted to said base, a trigger holder in connection with said latch mechanism, said trigger holder having one end engageable adjacent said base and having its other end engageable with the trigger when the latter is in upright position to maintain the latch mechanism in engaging position, said trigger being movable to release the trigger holder and latch mechanism and cause springing of the trap.

8. In a live trap for animals, a base, releasable means connected to said base for enclosing an animal, yielding means normally urging said releasable means to enclosing position, latch mechanism for holding said releasable means in set position against the tension of said yielding means, and a trigger supported by said base and connectible with said latch mechanism to maintain the latter in latching position, said trigger being positioned a substantial distance off center and being operable in an outwardly direction only so that the animal is entirely within the trap when the trigger is engaged by it.

9. In a trap for animals, a base, releasable means connected to said base for enclosing an animal, yielding means normally urging said releasable means to enclosing position, latch mechanism for holding said releasable means in said position against the tension of said yielding means, and a trigger supported by said base and connectible with said latch mechanism to maintain the latter in latching position, said trigger being positioned away from the center of the trap a distance at least equal to half of the distance between the center and the edge and being operable in an outwardly direction only so that the animal is entirely within the trap when the trigger is engaged by it.

In testimony whereof, I affix my signature.

JOHN SCHULKE.